No. 618,596. Patented Jan. 31, 1899.
E. L. WILLIAMS.
ACETYLENE GAS GENERATOR.
(Application filed Nov. 17, 1898.)

(No Model.)

Witnesses
F. H. Schott
Anton Gloetzner

Inventor
Edward L. Williams
By Offield Towle & Linthicum
Attorneys.

THE NORRIS PETERS CO., PHOTO-LITHO., WASHINGTON, D. C.

UNITED STATES PATENT OFFICE.

EDWARD L. WILLIAMS, OF KENOSHA, WISCONSIN.

ACETYLENE-GAS GENERATOR.

SPECIFICATION forming part of Letters Patent No. 618,596, dated January 31, 1899.

Application filed November 17, 1898. Serial No. 696,708. (No model.)

*To all whom it may concern:*

Be it known that I, EDWARD L. WILLIAMS, of Kenosha, in the county of Kenosha and State of Wisconsin, have invented certain new and useful Improvements in Acetylene-Gas Generators, of which the following is a specification.

This invention relates to an improvement in acetylene-gas generators, and is applicable to a wide variety of uses, including the generation of acetylene gas for lighting and heating, cooking, &c.

I have shown the invention embodied in a vehicle-lamp.

Figure 1:
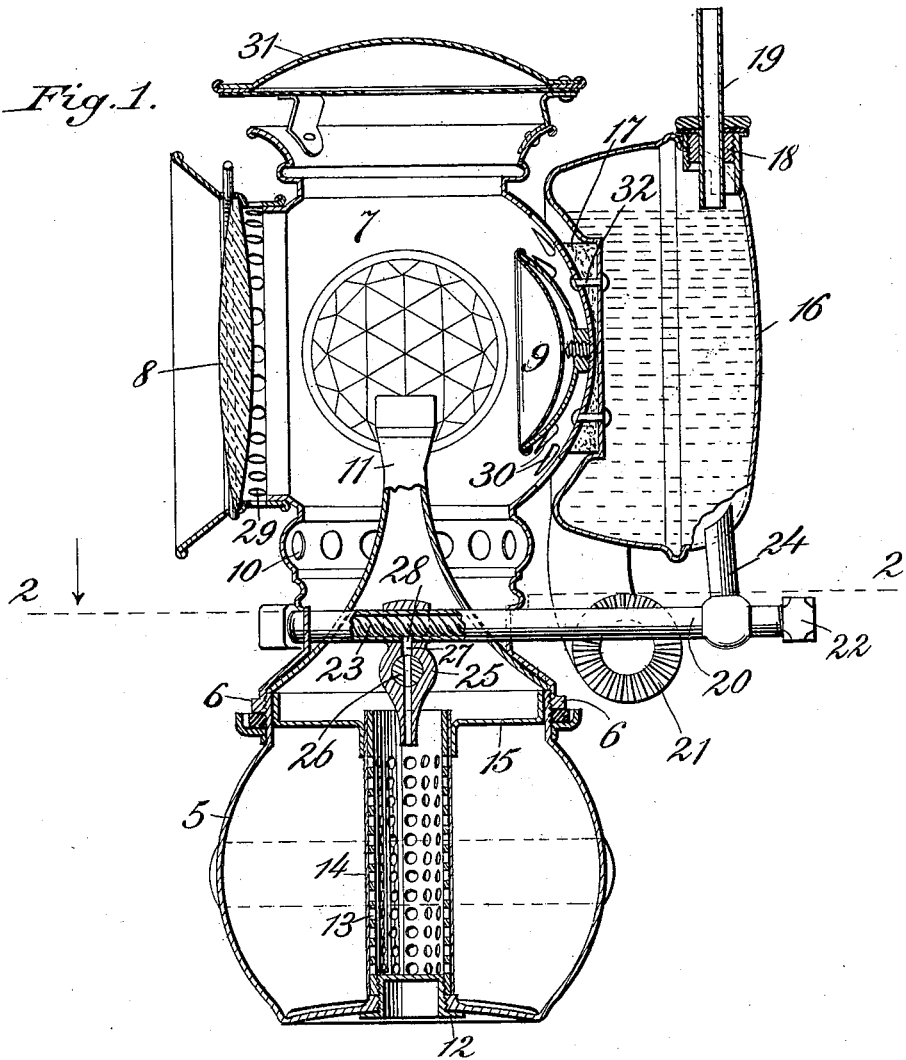
Figure 2:
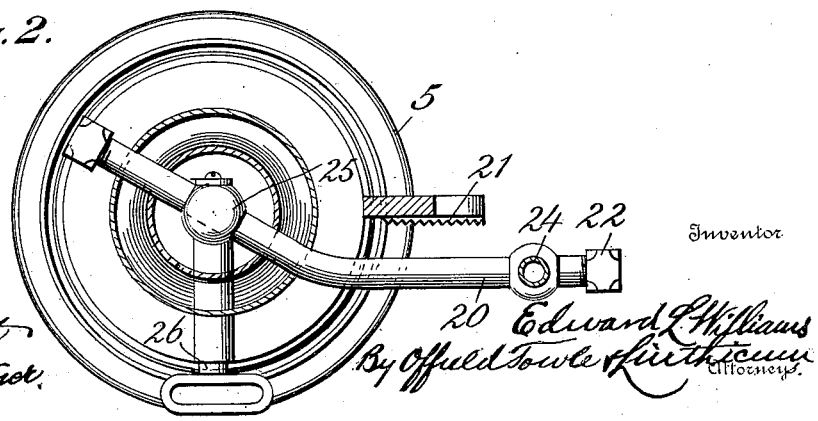

In the drawings, Figure 1 is a sectional elevation of a generator of my improved construction embodied in a bicycle-lamp. Fig. 2 is a sectional plan below the line 2 2 of Fig. 1.

My invention relates to the construction of a generator in which a liquid, such as water, is delivered in regulated supply to the body of carbid, the water being fed by gravity and fractionated by passing it through the tube, pipe, or passage packed with fibrous or porous material, which obstructs the free flow of the water and causes it to be fed drop by drop into the chamber containing the carbid.

I will describe my invention as applied to a bicycle-lamp, and I prefer to make the lamp in the form shown in the accompanying drawings. A lamp of this character embraces the following structural features, namely: a water-reservoir in which a head of water is maintained, a generating-chamber at a lower elevation and in which chamber the carbid is placed, a flame-chamber containing a burner in communication with the generating-chamber, and a means for feeding the water in regulated quantities to the generating-chamber.

I preferably mount the flame-chamber upon and in the vertical plane of the generating-chamber and attach the water-reservoir to the back of the flame-chamber; but it will be understood that this arrangement may be varied and that the water-reservoir may be separately mounted or that it may be mounted above the generating-chamber and the flame-chamber arranged at a distance.

My invention relates chiefly to the means for feeding the water in regulated quantities to the carbid, and these means comprise a tube or pipe packed with a porous or fibrous material connected at one end with the water-reservoir and having a drip tube or outlet leading to the carbid-chamber. The porous material or packing within the tube serves to fractionate or mechanically divide the water and also to resist its flow, causing it to be delivered drop by drop into the carbid-chamber. This tube is kept out of the influence of the heat caused by the generation of the gas, and this I preferably accomplish by extending the tube in a substantially horizontal plane at right angles to the vertical axis of the lamp. By so doing the tube is kept out of the influence of the heat, and its shape or form is such that the packing therein may be readily removed or replaced. I preferably provide this tube with a branch or drip pipe and place in said drip-pipe a valve, leaving a small space between the packing and the valve, so as to maintain a small supply of water ready to be delivered into the generating-chamber as soon as the valve is opened, which stored supply of water will start the generation of the gas, and the porous material within the tube being saturated with water will furnish an additional supply before the stored supply is exhausted.

By my invention I am enabled to provide a perfectly self-regulating generator wherein the supply of gas is automatically controlled without the use of regulating-valves or other mechanical devices or contrivances.

In the accompanying drawings, 5 represents the cup to contain carbid, and the interior of which constitutes the generating-chamber. Mounted thereon is the base 6 of the flame-chamber 7, the latter being preferably globular in form and having the front glass or lens 8 and reflector 9. Suitable ventilation is afforded by the perforations 10 in the base-ring 6. A burner 11 is mounted axially of the lamp, and its tip is in communication with the generating-chamber. The bottom of the cup 5 has a screw-plug 12, and a perforated pipe 13 is secured thereto and covered with a fabric envelop 14. A diaphragm-plate 15 is secured in the upper part of the chamber at the base of the burner. The water-reservoir 16 is shown as connected to the back of the body 7, its front side being sunken or dished, and a suitable insulating material 17—such as vulcanized fiber—is interposed between the body of water and the back of the flame-chamber. The front of the water-reservoir may be made of curved form, or the back of the flame-chamber may be slightly flattened and the insulating material 17 of equal diameter throughout. The water-reservoir has a suitable filling-opening with a removable closure 18, containing an escape pipe or vent 19.

20 represents the fractionating-tube, which in a lamp intended for use upon a bicycle is usually four or five inches long. It is preferably arranged in a horizontal plane and may be slightly deflected or bent between its ends to enable it to pass the ratchet member 21, to which a bracket is secured. The tube 20 is preferably a small pipe—say a quarter of an inch in external diameter—composed of, say, twenty-two-inch-gage metal. The ends of the pipe are closed by the screw-caps 22, and the interior of the pipe is filled with a porous material, preferably woolen yarn in the form of a wick. One end of this pipe is connected by the branch pipe 24 with the water-reservoir, and it is provided with a drip-pipe 25, having therein a straightway valve 26. A small space 27 is left between the upper surface of the valve and the porous material, the pipe 20 being perforated, as at 28, to communicate with the drip-tube.

When the carbid is placed within the generating-chamber surrounding the perforated pipe 14 and the valve 26 is opened, the small quantity of water held in the cavity 27 will be immediately discharged downwardly through the perforated tube and, escaping through its perforations, will saturate the fabric envelop 13 and be lifted by capillary action and brought into contact with the mass of carbid contained within the generating-chamber. As the porous material 23 will also be saturated with water, it will almost immediately begin to supply the water in regulated quantities or drop by drop, and these drops will afford sufficient liquid to generate the gas adequate to supply the flame at the tip of the burner. This action will continue uninterruptedly and regularly if the generator be maintained stationary. If, however, it be subjected to shocks or jars—as, for example, when used upon a bicycle passing over obstructions—the water will be caused to feed more rapidly, and a corresponding increase of gas-pressure will result. Before this gas-pressure becomes excessive it will operate to retard the further supply of water by exerting its pressure through the drip-tube and through the porous material inclosed within the supply-pipe, the gas-pressure, if greatly excessive, finding vent through the pipe 19. It will be understood that the latter, however, is a safety device and would not be useful as an escape or vent except under extraordinary conditions; but it further provides for admitting atmospheric pressure above the body of water in the reservoir. With this construction the water column is balanced by the obstruction of the porous material inclosed within the tube and by the constantly-exerted pressure of the gas upwardly through the drip-tube and through said porous material, thus tending to maintain an equilibrium and making the device entirely automatic.

Some of the details of construction of this lamp I consider to be of considerable importance—as, for example, the flame-chamber is supplied with the necessary oxygen to support combustion through the perforations 10, while the body of the flame-chamber is also thoroughly ventilated by the perforations 29 behind the front glass 8 and at the back through the perforations 30, thus keeping the reflector cool. Ample ventilation is also provided at the top of the lamp through the opening below the cap 31. I consider the use of the insulating material 17 as highly important in preventing the water from being overheated and also as affording a substantial means, in connection with the rivets 32, for securing the reservoir to the back of the lamp. It is necessary to provide in these constructions a gas-tight joint, and as the body of the lamp and the walls of the reservoir are subject to different temperatures I find it preferable to insulate them from each other, so that the necessary tight joints will not be disturbed by the varying rates of expansion and contraction.

The importance of keeping the porous material out of the influence of the heat produced by the slaking of the carbid in the generating-chamber is this: When such porous material is subjected to a high degree of heat it becomes somewhat charred, and its quality and capacity for controlling the flow of water are impaired. Its isolation in point of location is sufficient protection against this overheating; but I preferably use the diaphragm-plate 15, which serves the purpose of further separating or isolating it from the main body of the generating-chamber and also serves to prevent the particles of carbid from passing into the burner-tip when the lamp is inverted or during oscillations such as occur in rough riding. The base of the burner-tip may be and preferably is filled with cotton or other flocculent material to serve as a strainer for the gas.

The features of my invention which are hereinafter claimed may be embodied in structures of widely-varying form and intended for a variety of uses. For example, they may be equally as well employed in house, carriage, street, or car lamps, in signal or switch lights, and generally for all purposes where an illuminant of this character is used. Furthermore, it will be understood that the lamp does not form an essential part of the generator, as the water-reservoir and means of controlling the supply of the water to the generating-chamber may be embodied in a generator alone and where the gas is piped to a holder or conveyed to a distance.

I claim—

1. A generator comprising in combination a generating-chamber to contain a solid, such as calcium carbid, a liquid-reservoir elevated above the generating-chamber, a tube or pipe adapted to receive a supply of liquid from the reservoir and having an outlet leading to the generating-chamber, said liquid-supply pipe being located externally to the generating-chamber and packed with fibrous or porous material whereby to fractionate the liquid passing therethrough to the outlet and the latter being exposed to the gas-pressure whereby any excess of gas reacts through the fractionating-tube to control the liquid-supply.

2. In a generator of the class described, the combination with a generating-chamber of a liquid-chamber adapted to maintain a body of liquid at a level above the generating-chamber, a tube or pipe located wholly externally to the generating-chamber and adapted to receive a supply of liquid from the liquid-chamber and provided with an outlet to the generating-chamber, a valve in said outlet and said tube being packed with porous or fibrous material from inlet to outlet substantially as described.

3. In a generator of the class described, the combination with a generating-chamber, of a liquid-chamber adapted to maintain a body of liquid at a level above the generating-chamber, a tube or pipe located externally to the generating-chamber and adapted to receive a supply of liquid from the liquid-chamber, and provided with an outlet to the generating-chamber, a valve in said outlet and said tube being packed with porous or fibrous material from inlet to outlet, and the outlet having a cavity between the valve and the packing to contain a limited supply of water, substantially as described.

4. In an acetylene-lamp, the combination of a generating-chamber, a flame-chamber mounted thereon and a water-reservoir connected to the back wall of the flame-chamber, said water-reservoir having its front wall dished, and a rigid block of insulating material, such as vulcanite fiber, interposed between the water-chamber and the flame-chamber, and a securing means passing through said insulating material, substantially as described.

EDWARD L. WILLIAMS.

Witnesses:
C. C. LINTHICUM,
CHAS. BROMELL.